(12) United States Patent
Pass et al.

(10) Patent No.: US 11,547,227 B2
(45) Date of Patent: Jan. 10, 2023

(54) SALAD STORAGE ASSEMBLY

(71) Applicants: Tammy L. Pass, Apollo Beach, FL (US); Dwayne A. Pass, Apollo Beach, FL (US)

(72) Inventors: Tammy L. Pass, Apollo Beach, FL (US); Dwayne A. Pass, Apollo Beach, FL (US)

(*) Notice: Subject to any disclaimer, the term of this patent is extended or adjusted under 35 U.S.C. 154(b) by 292 days.

(21) Appl. No.: 16/856,369

(22) Filed: Apr. 23, 2020

(65) Prior Publication Data
US 2020/0337485 A1    Oct. 29, 2020

Related U.S. Application Data

(60) Provisional application No. 62/838,914, filed on Apr. 25, 2019.

(51) Int. Cl.
| | | |
|---|---|---|
| *A47G 19/30* | (2006.01) | |
| *A47J 47/10* | (2006.01) | |
| *A47G 19/02* | (2006.01) | |

(52) U.S. Cl.
CPC ............. *A47G 19/30* (2013.01); *A47G 19/02* (2013.01); *A47J 47/10* (2013.01)

(58) Field of Classification Search
CPC ......... A47G 19/30; A47G 19/02; A47J 47/10; B65D 25/04; B65D 81/26; B65D 81/261; B65D 81/262
See application file for complete search history.

(56) References Cited

U.S. PATENT DOCUMENTS

| | | | | |
|---|---|---|---|---|
| 5,908,133 A | * | 6/1999 | Luburic | B65D 81/261 |
| | | | | 220/571 |
| D701,732 S | * | 4/2014 | Ehrenhaus | D7/566 |
| 8,887,665 B2 | * | 11/2014 | Rocker | A01K 5/0135 |
| | | | | 119/61.5 |
| 2016/0166114 A1 | * | 6/2016 | Tran | A23L 19/00 |
| | | | | 29/428 |
| 2016/0309962 A1 | * | 10/2016 | Hanson | A47J 36/08 |
| 2019/0322417 A1 | * | 10/2019 | Hurt | B65D 21/066 |

* cited by examiner

*Primary Examiner* — Don M Anderson
(74) *Attorney, Agent, or Firm* — William P. O'Meara; Cochran Freund & Young LLC

(57) ABSTRACT

A salad/produce storage assembly for storing and maintaining the quality of salad/produce. The assembly includes a bowl member having a bottom wall and an annular sidewall extending upwardly from the bottom wall and terminating at an upper edge portion. The assembly also includes an insert member having a bottom surface and a generally dome shaped, impervious upper surface that drains liquid received thereon downwardly and outwardly toward an annular peripheral portion of the insert. The insert member is insertable into the bowl member in overlying relationship with the bowl member bottom relationship with the bowl member annular sidewall. The bottom wall and a lower portion of the bowl member annular sidewall and the insert member bottom surface define a bowl liquid reservoir. Moisture draining from the dome shaped impervious upper surface of the insert member drains into the liquid reservoir where it remains separated from the salad/produce so it does not wick back into the salad/produce.

1 Claim, 7 Drawing Sheets

SALAD STORAGE ASSEMBLY

This application claims the benefit of U.S. Provisional Patent Application Ser. No. 62/838,914 of Tammy L. Pass and Dwayne A. Pass, entitled SALAD STORAGE ASSEMBLY, filed Apr. 25, 2019, which is hereby incorporated by reference for all that it discloses.

BACKGROUND

Salad, after being prepared, deteriorates rapidly, in spite of attempts to preserve it. The present application discloses an easy to use salad storage assembly with minimal components that helps maintain the quality of salad stored therein.

SUMMARY

A salad storage assembly for storing and maintaining the quality of salad includes a bowl member having a bottom wall and an annular sidewall extending upwardly from the bottom wall and terminating at an upper edge portion. The salad storage assembly also includes an insert member having a bottom surface and a generally dome shaped, impervious upper surface that drains liquid received thereon downwardly and outwardly toward an annular peripheral portion of the insert. The insert member is insertable into the bowl member in overlying relationship with the bowl member bottom wall and with the annular peripheral portion of the insert member positioned in adjacent relationship with the bowl member annular sidewall, the bottom wall and a lower portion of the bowl member annular sidewall and the insert member bottom surface defining a bowl liquid reservoir so that moisture draining from the dome shaped impervious upper surface of the insert member drains into the bowl liquid reservoir.

A method of extending salad freshness includes providing a salad storage assembly having a lower liquid collection reservoir and an upper salad storage chamber that are separated by a liquid impervious member having an upper convex surface with peripheral openings therein. The method also includes placing salad on the upper convex surface of the liquid impervious member so that moisture draining from the salad contacts the upper convex surface and drains through the peripheral openings into the lower liquid collection reservoir, so the moisture draining from the salad remains physically separated from the salad.

A produce storage assembly for storing and maintaining the quality of produce includes a bowl member having a bottom wall and an annular sidewall extending upwardly from the bottom wall and terminating at an upper edge portion. The produce storage assembly also includes an insert member having a bottom surface and a generally dome shaped, impervious upper surface that drains liquid received thereon downwardly and outwardly toward an annular peripheral portion of the insert. The insert member is insertable into the bowl member in overlying relationship with the bowl member bottom wall and with the annular peripheral portion of the insert member positioned in adjacent relationship with the bowl member annular sidewall. The bottom wall and a lower portion of the bowl member annular sidewall and the insert member bottom surface define a bowl liquid reservoir. Moisture draining from the dome shaped impervious upper surface of the insert member drains into the bowl liquid reservoir.

DETAILED DESCRIPTION

Salads deteriorate due to vegetable decay, which begins when salad vegetables are exposed to air. Vegetable decay is accelerated by the presence of moisture in the salad environment. As vegetables decay, they emit moisture ("perspire"). The decaying vegetables thus add moisture to the salad environment, maintaining or accelerating vegetable decay in the salad. Applicants have discovered that salad deterioration can be slowed by a relatively simple structure that uses gravity to remove moisture from the salad environment. As used herein the term "produce" refers to fruit and/or vegetables, whether cut up and combined, as in a salad, or separate, for example, strawberries.

Figure 1:
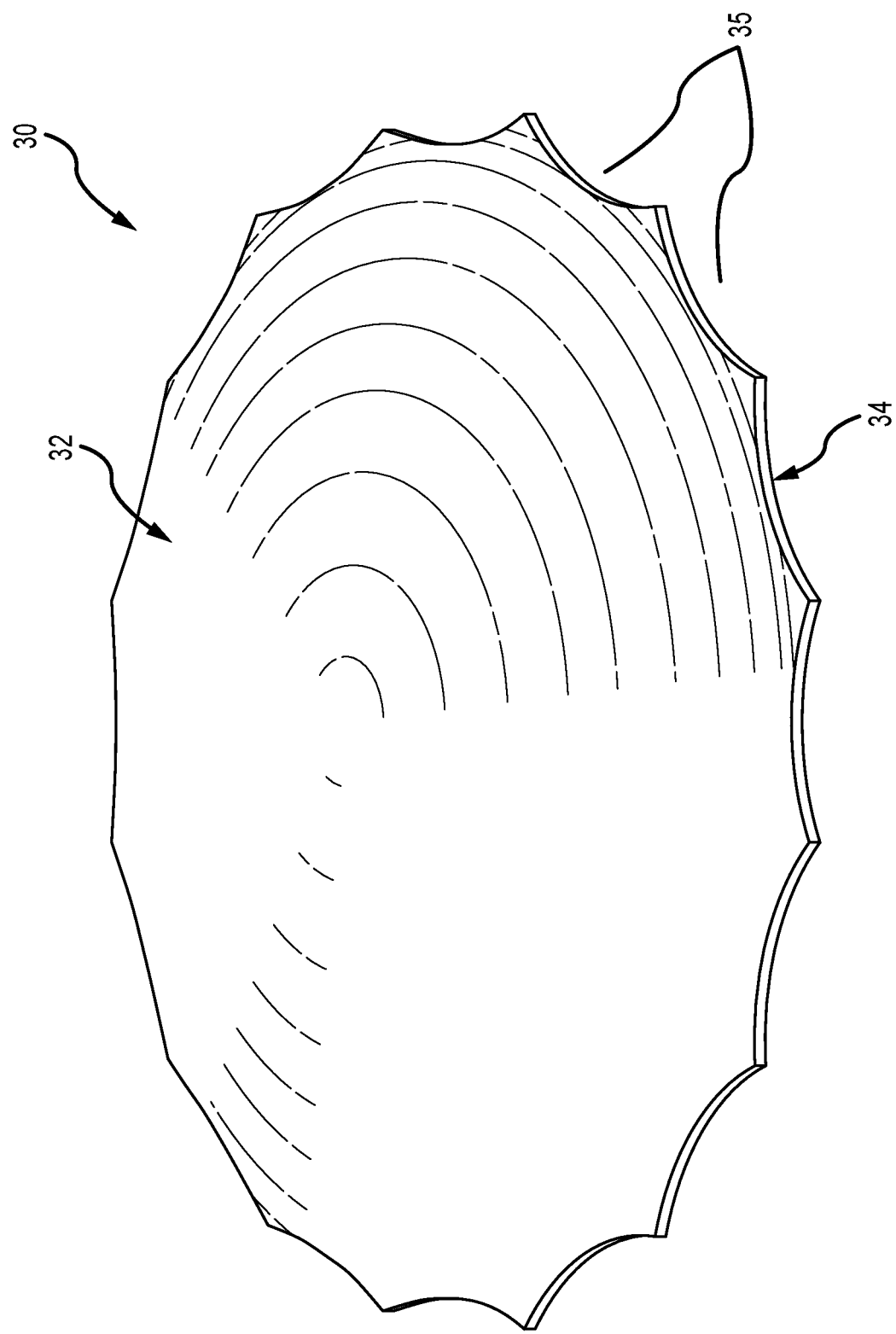
FIG. 1 is a top plan isometric view of an insert of a salad/produce storage assembly.
Figure 2:
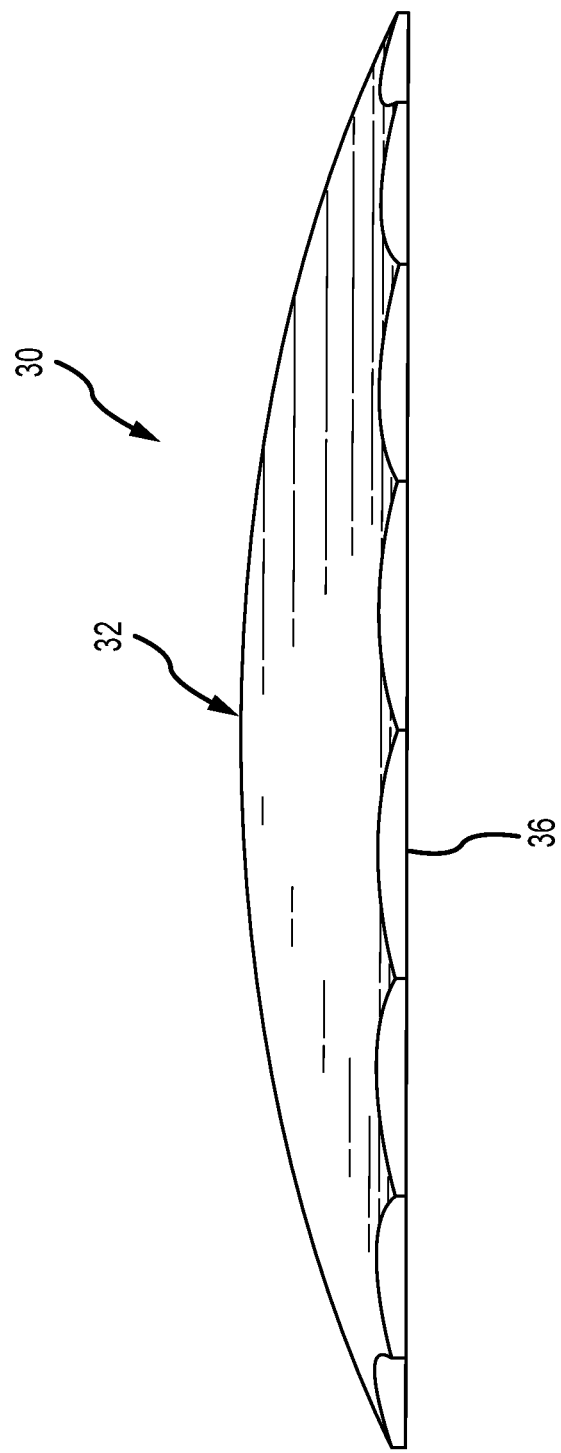
FIG. 2 is a side elevation view of the insert of FIG. 1.
Figure 3:
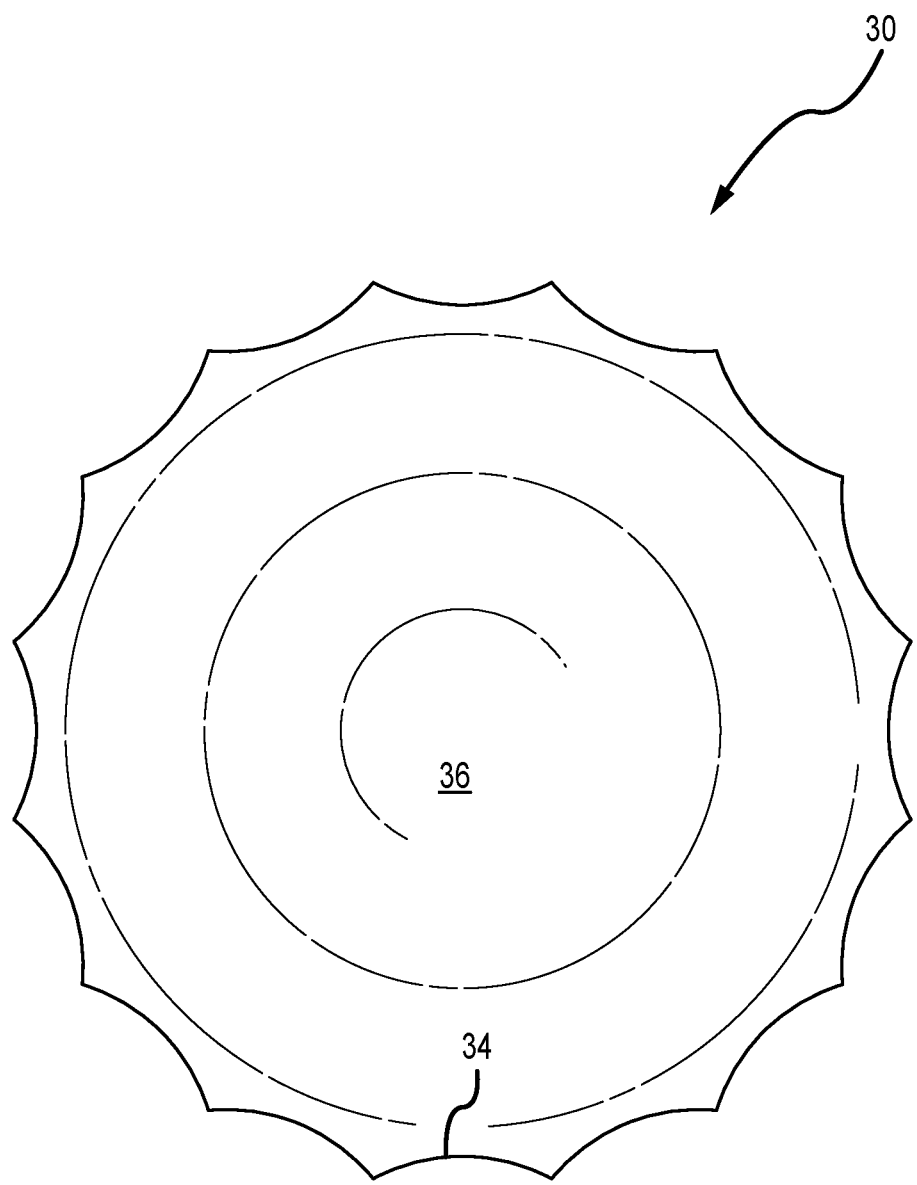
FIG. 3 is a bottom plan view of the insert of FIG. 1.
Figure 4:
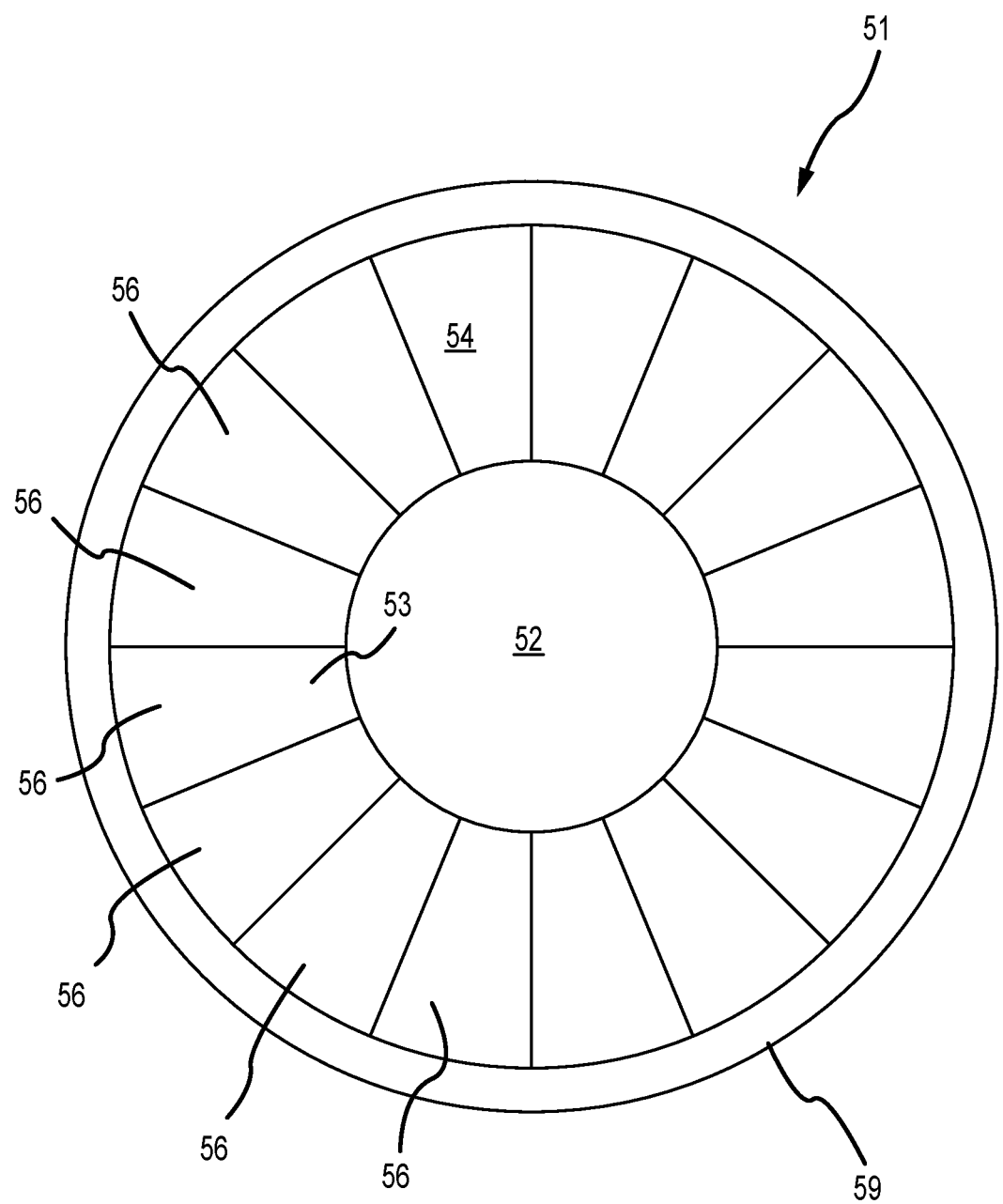
FIG. 4 is a top plan view of a bowl member of a salad/produce storage assembly.

FIGS. 1-3 illustrate one embodiment of an insert 30 of a salad storage assembly. FIG. 1 is a top isometric view of the insert 30; FIG. 2 is a side elevation view thereof; FIG. 3 is a bottom plan view thereof; and FIG. 4 is a top plan view of a bowl member 51 that receives insert 30.

Figure 5:
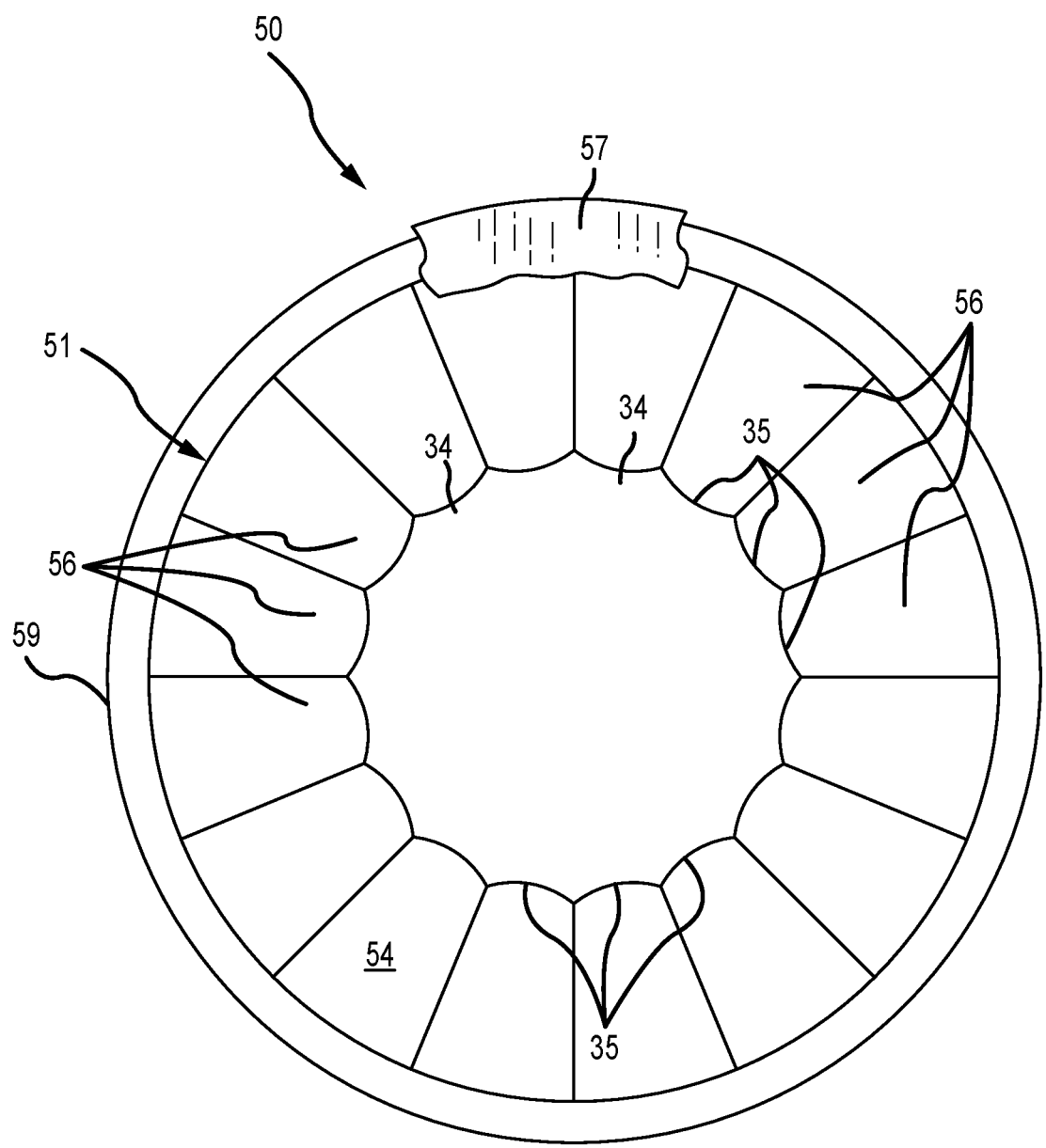
FIG. 5 is a top plan view of the bowl member of FIG. 4 with the insert of FIG. 1 positioned therein.

The insert 30 has a dome shaped (convex) upper surface 32 that is adapted to drain moisture deposited on it in an outward direction towards a peripheral portion 34 of the insert 30. In the illustrated embodiment of FIGS. 1-6, the peripheral portion 34 defines a plurality of scallop shaped indentions/openings 35. The scalloped peripheral portion 34 allows liquid draining from the upper surface 32 to run over the edge of the peripheral portion 34 and through the scalloped openings 35, even when the peripheral portion 34 is engaged with a sidewall 54 of a bowl member 51 in which the insert 30 is positioned, FIGS. 5-6. In one embodiment, best shown in FIG. 4, the bowl member 51 has a flat circular bottom portion 52 integrally formed with an upper annular wall portion 54 defined by a plurality of integrally connected fluted wall sections 56.

Figure 6:
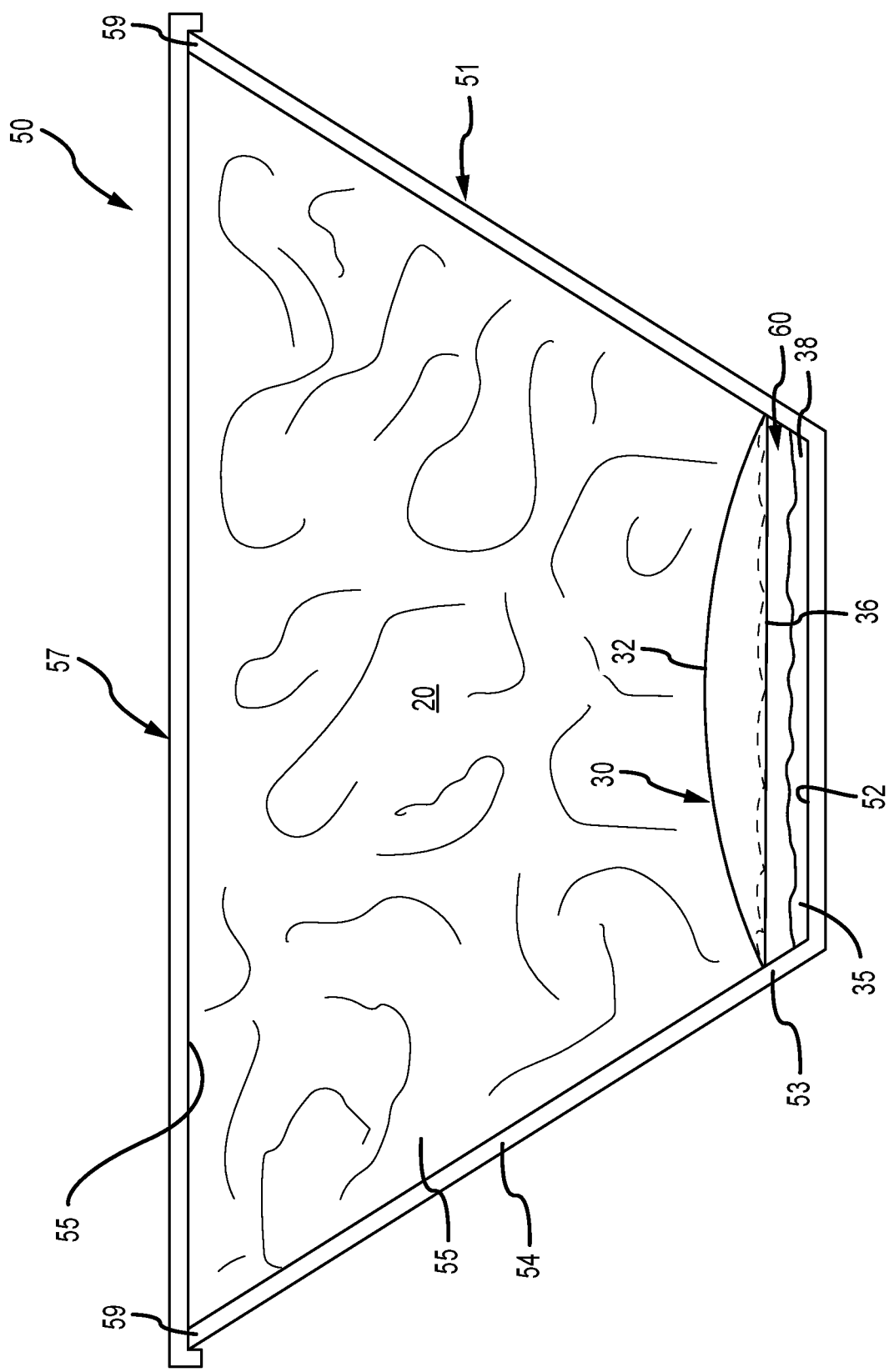
FIG. 6 is a cross sectional side elevation view of a salad/produce storage assembly with salad/produce stored therein.

In one embodiment the insert 30 may have a flat bottom surface portion 36 as best shown in FIGS. 2 and 3. In one example embodiment of the salad storage assembly 50, the salad bowl member 51 and the insert 30 are constructed and arranged so that the bottom most surface 36 of the insert is positioned more than about one quarter inch above a bottom wall interior surface 52 of the bowl member 51, FIG. 6. In other embodiments this separation distance may be less than about one quarter inch. Thus, a liquid reservoir 60 is formed in a lower portion the bottom portion 53 of the salad bowel 51 that will hold moisture/liquid 38 in the bowl 51, without the liquid 38 coming into direct contact with salad 20 in the bowl 51, as best shown in FIG. 6. In other words, the salad 20 rests on the insert member dome shaped upper surface 32, which holds the salad 20 above and in spaced apart relationship with liquid 38 in the liquid reservoir 60. The upper surface 32 of the insert 30 is impervious to liquid, so liquid 38 in the reservoir 60 does not contact the salad 20 once it drains off. The salad chamber 55 is formed by an upper annular wall portion 54 of the bowl member 51, the upper surface 32 of the insert 30, and a bottom surface of a lid 57.

The lid 57, FIG. 6, may be sealingly mounted on the bowl member upper edge 59, FIG. 6. The liquid reservoir 60 is formed in the lower portion 53 of the bowl member 51 below the insert 30, as best shown in FIG. 6. In some embodiments, the bowl member may be a "green bowl" with an element that absorbs gas, such as ethane gas. The bowl may be made from glass, plastic, ceramic or other material.

The dome shaped insert 30 and bowl member 51 co-act to drain moisture away from the salad 20 and then keep the salad 20 out of the moisture that was drained off. Without the insert 30, the salad 20 would remain in contact with the drained off moisture at the bottom of the bowl, which would wick back into the salad increasing its rate of deterioration. Thus, the insert 30 and bowl 51 synergistically co-act to provide a unique result. The insert 30 and bowl member: 1) drain water from the salad 20 into a liquid reservoir defined by the insert and the bowl; and 2) define a salad chamber 55 separated from the drained off moisture 38 in the reservoir 60 by a liquid impervious surface 32 to prevent wicking of the moisture back into the salad. These functions preserve the quality of salad 20 in different ways. Also, in the embodiment shown in FIGS. 1-6, the scalloped peripheral portion 34 co-acts with the fluting 56 in the salad bowl member 51 to prevent displacement of the insert member 30 within the bowl member 51 while enabling moisture to drain from the salad 20. Furthermore, the insert 30 supports the salad 20 at a position where it can be easily accessed and conveniently removed from the bowl member 51.

Figure 7:
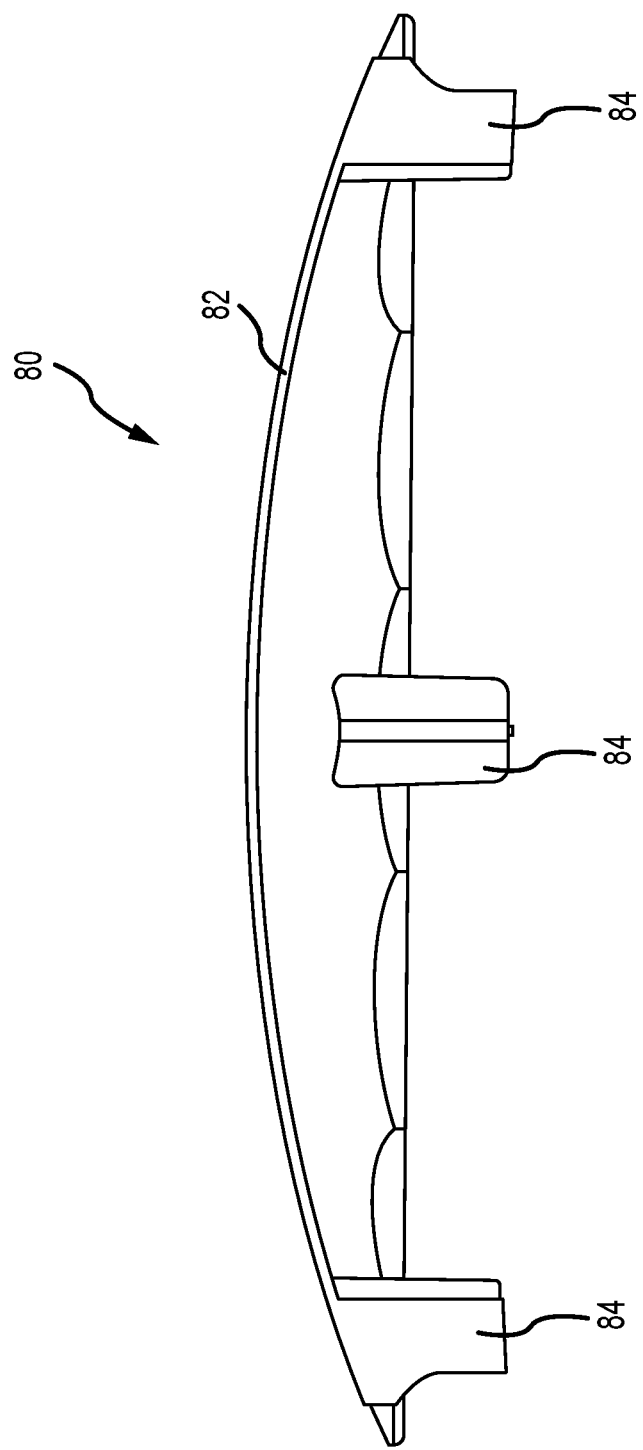
FIG. 7 is a side elevation view of another embodiment of an insert of a salad/produce storage assembly.

FIG. 7 depicts a portion of a salad storage assembly embodiment in which a salad bowl insert member 80 has a dome shaped upper surface 82, which may be positioned at a desired elevation above a bowl member bottom surface, e.g. 52, FIG. 6 by legs 84 or other structure attached to a peripheral portion of the insert 80. These legs 84 contact the bottom surface of a bowl into which the insert is placed. The legs 84 thus hold the impervious insert upper surface 84 above any liquid collecting in the bowl below the insert 80.

In the embodiments described above, the openings 35 in the insert member, e.g., 30 or 80, are provided by scalloping. Openings, such as peripheral slots, grooves, and edge cut-outs of various shapes (not shown) may be used in alternative embodiments.

Although various embodiments of a salad/produce storage assembly and methods of use thereof have been expressly described in detail herein, alternative embodiments of salad/produce storage assemblies and methods of use will become obvious to those skilled in the art after reading this disclosure. It is intended that the language of the appended claims be construed broadly to cover such alternative embodiments, except as limited by the prior art.

What is claimed is:

1. A salad storage assembly for storing and maintaining the quality of salad comprising:
   a bowl member having a bottom wall and an annular sidewall extending upwardly from the bottom wall and terminating at an upper edge portion; and
   an insert member having a bottom surface and a generally dome shaped, impervious upper surface that drains liquid received thereon downwardly and outwardly toward an annular peripheral portion of the insert; the insert member being insertable into the bowl member in overlying relationship with the bowl member bottom wall and with the annular peripheral portion of the insert member positioned in adjacent non-sealing relationship with the bowl member annular sidewall, the bottom wall and a lower portion of the bowl member annular sidewall and the insert member bottom surface defining a bowl liquid reservoir so that moisture draining from the dome shaped impervious upper surface of the insert member drains into the bowl liquid reservoir;
   wherein the bowl member has an annular sidewall adapted to co-act with annular peripheral portion of the insert member to stably position the insert member in the bowl member;
   wherein the annular peripheral portion of the insert member comprises a plurality of scalloped portions; and
   wherein the bowl member annular sidewall comprises a plurality of fluted portions that co-act with the scalloped portions.

* * * * *